(12) United States Patent
Kaneeda et al.

(10) Patent No.: US 6,630,115 B1
(45) Date of Patent: Oct. 7, 2003

(54) EXHAUST EMISSION CONTROL PROCESS FOR INTERNAL COMBUSTION ENGINES

(75) Inventors: Masato Kaneeda, Hitachi (JP); Kojiro Okude, Hitachi (JP); Hidehiro Iizuka, Hitachinaka (JP); Toshio Ogawa, Takahagi (JP); Kousei Nagayama, Tokaimura (JP); Hisao Yamashita, Hitachi (JP); Yuichi Kitahara, Hitachinaka (JP); Osamu Kuroda, Hitachi (JP); Morio Fujitani, Akashi (JP); Toshifumi Hiratsuka, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/529,636

(22) PCT Filed: Dec. 10, 1999

(86) PCT No.: PCT/JP99/06951

§ 371 (c)(1),
(2), (4) Date: Apr. 17, 2000

(87) PCT Pub. No.: WO00/35564

PCT Pub. Date: Jun. 22, 2000

(30) Foreign Application Priority Data

Dec. 11, 1998 (JP) .......................................... 10-352272

(51) Int. Cl.$^7$ .............................................. C01B 21/00
(52) U.S. Cl. ................................... 423/213.5; 423/245
(58) Field of Search ............................... 502/324, 328, 502/330, 339, 325, 344, 340, 337, 345, 302, 202, 207, 208, 213; 423/212, 213.2, 213.5, 213.7, 239.1, 247, 245

(56) References Cited

U.S. PATENT DOCUMENTS

| 5,049,364 | A |   | 9/1991  | Yoshimoto et al. |
| 5,128,305 | A |   | 7/1992  | Yoshimoto et al. |
| 5,143,707 | A | * | 9/1992  | Beck et al. ................. 423/239 |
| 5,290,530 | A | * | 3/1994  | Muramatsu et al. ..... 423/239.1 |
| 5,471,836 | A |   | 12/1995 | Takeshima et al. ........... 60/297 |
| 5,552,128 | A | * | 9/1996  | Chang et al. ................ 423/235 |
| 5,665,322 | A | * | 9/1997  | Kiyohide et al. ......... 423/213.5 |
| 5,911,960 | A |   | 6/1999  | Miyoshi et al. |
| 5,968,870 | A |   | 10/1999 | Iizuka et al. |
| 5,972,828 | A | * | 10/1999 | Doi et al. .................... 502/302 |
| 6,045,764 | A | * | 4/2000  | Ilzuka et al. ............. 423/213.5 |
| 6,093,377 | A | * | 7/2000  | Ilzuka et al. ............. 423/213.5 |

FOREIGN PATENT DOCUMENTS

| CA | 1190535      | 7/1985  |
| EP | 0 362 960    | 4/1990  |
| EP | 0 613 714    | 9/1994  |
| JP | 2-099142     | 4/1990  |
| JP | 6-262040     | 9/1994  |
| JP | 07-155604    | 6/1995  |
| JP | 8-299793     | 11/1996 |
| JP | 09-103652    | 4/1997  |
| JP | 10-043591    | 2/1998  |
| JP | 10-118458    | 4/1998  |
| JP | 2000-042369  | 2/2000  |
| WO | WO 93/07363  | 4/1993  |

OTHER PUBLICATIONS

International Search Report no date.

* cited by examiner

*Primary Examiner*—Stanley S. Silverman
*Assistant Examiner*—Edward M. Johnson
(74) *Attorney, Agent, or Firm*—Crowell & Moring LLP

(57) ABSTRACT

In an exhaust gas purification process for eliminating nitrogen oxides contained in a combustion exhaust gas emitted from an internal combustion engine with a reducing gas such as carbon monoxide, hydrocarbons, etc. contained in the exhaust gas in the presence of a catalyst, a catalyst comprising all of Rh, Pt and Pd, at least one member selected from alkali metals and alkaline earth metals, and Mn or its compound, supported on a porous carrier is used.

6 Claims, 1 Drawing Sheet

EXHAUST EMISSION CONTROL PROCESS FOR INTERNAL COMBUSTION ENGINES

TECHNICAL FIELD

The present invention relates to an exhausts gas purification apparatus, an exhaust gas purification process and an exhaust gas purification catalyst with high elimination efficiency of NOx from NOx-containing exhaust gases such as combustion exhaust gases from internal combustion engines such as automobile engines, etc.

BACKGROUND ART

Lean-burn engines capable of bringing an air/fuel ratio into a fuel-lean stage have been nowadays regarded as promising automobile internal combustion engines from the viewpoint of reduced fuel consumption. However, the exhaust gases from such engines are in such an oxidizing atmosphere that the $O_2$ concentration of the exhaust gases is more than a stoichiometric amount necessary for complete combustion of reducing components contained in the exhaust gases (said atmosphere will be hereinafter referred as "oxidizing atmosphere"). The conventional ternary catalysts are directed to efficient purification of NOx, HC and CO in such a reducing atmosphere that the $O_2$ concentration of the exhaust gases is not more than a stoichiometric amount necessary for complete combustion of reducing components contained in the exhaust gases. (said atmosphere will be hereinafter referred to as "reducing atmosphere"), failing to show a satisfactory NOx elimination activity in the oxidizing atmosphere. Thus, it has been keenly desired to develop catalysts capable of effectively eliminating NOx, HC and CO, particularly NOx, in the oxidizing atmosphere.

For exhaust gas purification directed to the lean-burn engines, W093/07363 and W093/08383 propose to provide an NOx absorbent in the exhaust gas passage. The NOx absorbent can absorb NOx from the exhaust gases during the fuel-lean combustion and discharge the absorbed Nox when the $O_2$ concentration of the exhaust gases is lowered.

JP-A-8-299793 also proposes to provide a catalyst which comprises an NOx-absorbing component capable of absorbing NOx from the exhaust gases during the fuel-lean combustion and an NOx-reducing component capable of reducing the absorbed NOx in the exhaust gas passage.

With more and more intensified atmospheric regulation of the automobile exhaust gases, much higher NOx elimination activity and durability are required for the Nox elimination catalysts directed to the lean-burn engines. The present invention provides an exhaust gas purification catalyst with distinguished NOx elimination activity and durability, particularly distinguished head resistance and SOx resistance, an exhaust gas purification apparatus and an exhaust gas purification process using said catalyst.

DISCLOSURE OF THE INVENTION

The present invention is directed to elimination of NOx in a combustion exhaust gas in an oxidizing atmosphere emitted from an internal combustion engine with a catalyst comprising a carrier and active components, the active components comprising at least one of Rh, Pt and Pd, at least one member selected from alkali metals and alkaline earth metals, and Mn.

One member selected from the alkali metals and alkaline earth metals can serve the desired purpose, but two or more members thereof can further improve the activity. It seems that new active sites are formed on the catalyst owing to two or more members of these metals supported on the carrier. An amount of supported alkali metals and alkaline earth metals is preferably in a range of 0.05 to 3 parts by mole each of the supported metals in terms of metal elements on the basis of 1.5 parts by mole of the porous carrier, where "parts by mole" means a proportion of one component to another in terms of moles; for example, "3 parts by mole of supported component B to 1.5 parts by mole of component A" means that component B is supported in a ratio of component B to component A being 3:1.5 terms of moles, irrespective of the absolute amount of component A. In case the amount of supported alkali metals and alkaline earth metals is less than 0.05 parts by mole each, the improvement of NOx elimination activity is less effective, whereas in case of more than 3 parts by mole the specific surface area of the alkali metals and alkaline earth metals becomes undesirably smaller.

The porous carrier may be supported on a substrate, where 0.3 to 4 moles of the porous carrier can supported on 1 l of the substrate preferably from the viewpoint of NOx elimination activity. In case the amount of supported porous carrier is less than 0.3 moles, the dispersibility of active components becomes poor, whereas in case of more than 4 moles the specific surface area of the porous carrier itself becomes undesirably smaller.

Mn is present in the form of metal or an oxide or a composite oxide with Al, etc. and seems to serve to capture NOx in the oxidizing atmosphere and further serve to improve the high temperature durability of the catalyst. By inclusion of both of at least one member of the alkali metals and alkaline earth metals and Mn the NOx-capturing effect can be further improved.

An amount of supported Mn is preferably in a range of 0.05 to 2 parts by mole in terms of metal element on the basis of 1.5 parts by mole of the porous carrier. In case the amount of supported Mn is less than 0.05 parts by mole, the effect is not remarkable, whereas in case of more tan 2 parts by mole the specific surface area of the catalyst becomes undesirably smaller.

Rh, Pt and Pd can enhance the elimination activity and high temperature durability. It is most desirable for the improvement of the activity and durability to contain all of these noble metals.

Amounts of supported noble metals are preferably in ranges of 0.002 to 0.05 parts by mole of Pt, 0.0003 to 0.01 part by mole of Rh and 0.001 to 0.2 parts by mole of Pd, all in terms of metal elements, on the basis of 1.5 parts by mole of the porous carrier. In case the amount of supported noble metals are less than their lower limits the effect is not remarkable, whereas in case of more than the upper limits the specific surface areas of the noble metals per se become smaller without remarkable effect.

When at least one of rare earth metals is supported thereon in addition to the foregoing components, the NOx elimination activity and high temperature durability can be further improved, where it is preferable to contain 0.02 to 0.5 parts by mole of each in terms of metal elements on the basis of 1.5 parts by mole of the porous carrier. In case of less than 0.02 parts by mole, the effect is not remarkable, whereas in case of more than 0.5 parts by mole the specific surface area of the catalyst becomes undesirably smaller. Preferable rare earth metals are La, Nd and Ce.

By further adding at least one of Ti and Si thereto, the NOx elimination efficiency and also the SOx resistance can be further improved. It seems that the effect of Ti and Si on the SOx resistance improvement is due to Ti and Si being formed into composite metals together with Mn, alkali metals and alkaline earth metals. By further adding at least one of Co, Ni and Cu thereto, the NOx elimination activity and the heat resistance can be further improved. Amounts of supported Ti, Co, Si, Ni and Cu are preferably in a range of 0.01 to 2 parts by mole of each in terms of metal elements on the basis of 1.5 parts by mole of the porous carrier.

The present catalyst can further contain at least one of B and P.

B and P are present in the form of simple substances or oxides or composite oxides with at least one member selected from alkali metals and Al, and seem to serve to capture NOx in the oxidizing atmosphere, play a role of attracting CO, hydrocarbons, etc. as reducing agents onto the catalyst surface and serve to further improve the heat resistance and the SOx resistance of the catalyst. By controlling mixing sequence of B or P or firing temperature, etc. during the catalyst preparation, they can be brought into the oxide form or the composite oxide form.

An amount of supported B or P is preferably in a range of 0.01 to 2 parts by mole of each in terms of elements on the basis of 1.5 parts by mole of the porous carrier. In case of less than 0.01 part by mole of supported B or P the effect is not remarkable, whereas in case of more than 2 parts by mole the specific surface area of the catalyst becomes undesirably smaller.

The catalyst can be prepared by any procedure utilizing physical means or chemical reactions such as impregnation, kneading, coprecipitation, sol-gel formation, ion exchange, vapor deposition, etc.

Starting materials for use in the catalyst preparation include various compounds such as nitrate compounds, acetate compounds, complex compounds, hydroxides, carbonate compounds, organic compounds etc., metals and metal oxides.

For the porous carrier, metal oxides, composite oxides, etc. such as alumina, titania, silica, silica-alumina, zirconia, magnesia, etc. can be used, among which alumina is most preferable. The present catalyst can be used upon coating onto a substrate. Cordierite is a most suitable substrate, but even a metal such as stainless steel can be used as well.

The NOx elimination catalyst can be used in any form, for example, honeycomb form, pellet form, plate form, granule form, powder form, etc., among which the honeycomb form is most preferable.

The present catalyst has an effect of eliminating NOx contained in the exhaust gases emitted from internal combustion engines during the lean-burn operation with high elimination efficiency. The NOx elimination effect of the present catalyst seems due to an action of capturing NOx contained in the lean-burn exhaust gas on the catalyst surface, thereby eliminating NOx from the exhaust gas and an action of reducing the captured NOx, thereby eliminating it. Capturing of NOx seems to be effected by absorption, chemisorption, etc.

The exhaust gas during the lean-burn operation contain oxygen at a higher concentration than the stoichiometric amount necessary for complete combustion of reducing components (HC and CO) in the exhaust gas and thus is in an oxidizing atmosphere. The exhaust gas in an oxidizing atmosphere will be hereinafter referred to as "lean exhaust gas" or "air/fuel ratio-lean exhaust gas". An exhaust gas emitted from internal combustion engines upon combustion in a theoretical air/fuel ratio will be hereinafter referred to as "stoichiometric exhaust gas" or "air/fuel ratio-stoichiometric exhaust gas". An exhaust gas emitted from internal combustion engines operated in fuel excess over the theoretical air/fuel ratio contains oxygen at a lower concentration than the stoichiometric amount necessary for complete combustion of the reducing components contained in the exhaust gas and thus is in a reducing atmosphere. The exhaust gas in a reducing atmosphere will be hereinafter referred to as "rich exhaust gas" or "air/fuel ratio-rich exhaust gas".

One embodiment of the present invention provides an exhaust gas purification apparatus provided with said catalyst in the exhaust gas passage from internal combustion engines in lean-burn operation.

Another embodiment of the present invention provides an exhaust gas purification process for purifying an exhaust gas emitted by lean-burn operation upon contacting the exhaust gas with said catalyst.

When the present catalyst is kept in continuous contact with an air/fuel ratio-lean exhaust gas, the NOx elimination efficiency will be gradually lowered, because the amount of captured NOx on the catalyst surface gradually increases, thereby weakening the capturing action. When the NOx elimination efficiency is so lowered, it is desirable to temporarily shift the lean-burn operation to a theoretical air/fuel ratio operation or a fuel excess operation, thereby bringing the air/fuel ratio of the exhaust gas into a stoichiometric or fuel-rich exhaust gas, the NOx elimination action can proceed so actively that the NOx captured on the catalyst surface can be rapidly eliminated to regenerate the catalyst. Thus, when the operation is shifted again to the lean-burn operation once again, high NOx elimination efficiency can be obtained. The duration of the theoretical air/fuel ratio or fuel excess operation is only a few seconds to a few minutes.

The present catalyst can be used in combination with a combustion catalyst capable of combusting HC and CO. For the combustion catalyst capable of combusting HC and CO, it is desirable to use a catalyst comprising Pt and Rh supported on an alumina carrier or a catalyst comprising Ag and Mn supported on an alumina carrier. The combustion catalyst can be provided at a position upstream or downstream of the present catalyst or at both upstream and downstream positions.

BEST MODES FOR CARRYING OUT THE INVENTION

Figure 1:
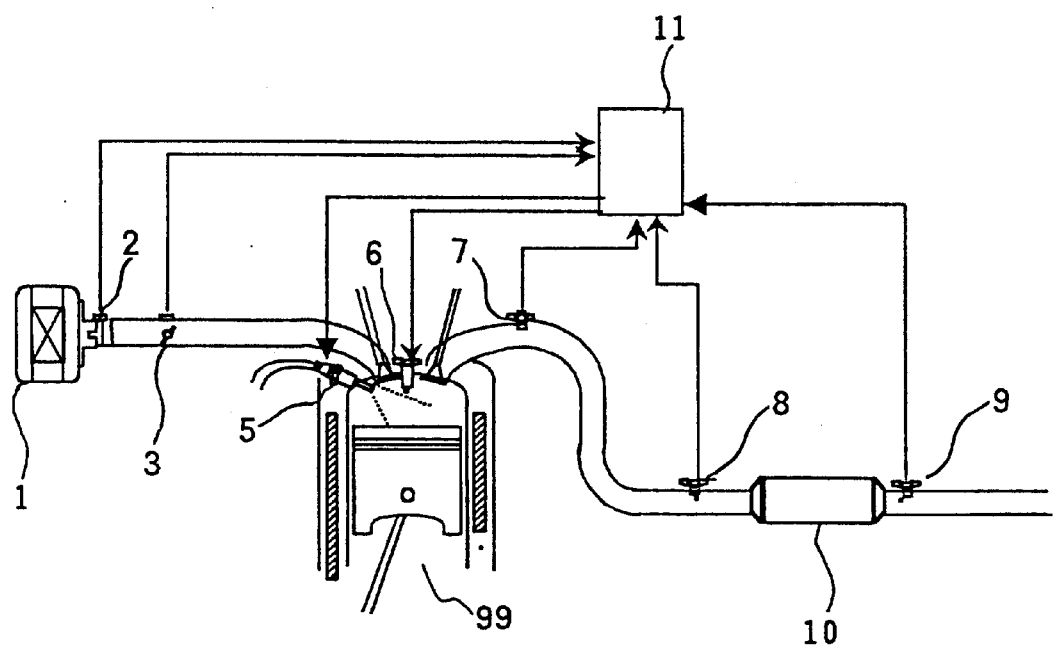
FIG. 1 is a schematic view of an exhaust gas purification apparatus according to one embodiment of the present invention.

FIG. 1 shows one embodiment of the present exhaust gas purification apparatus.

In FIG. 1 are shown a lean-burn engine 99, a suction system comprising an air cleaner 1, an air flow sensor 2 and a throttle valve 3, an exhaust gas purification system comprising an oxygen concentration sensor 7, an exhaust gas temperature sensor 8, a catalyst outlet gas temperature sensor 9, an exhaust gas purification catalyst 10, etc., an engine control unit (ECU) 11, etc. ECU 11 comprises an I/O as an input/output interface, an LSI, a microprocessing unit (MPU), memory units RAM and ROM memorizing a large number of control programs, a timer/counter, etc.

Suction air to the engine is filtered through the air cleaner, then metered by the air flow sensor 2, passed through the throttle valve 3, subjected to fuel injection from an injector 5, and fed to the engine 99 as a mixed gas. Air flow sensor signals and other sensor signals are input into the ECU (Engine Control Unit) 11.

ECU evaluates the operating state of the internal combustion engine and the state of the exhaust gas purification catalyst and judges an operating air/fuel ratio, thereby controlling the injection time of the injector 5, etc. to set the fuel concentration of the mixed gas to a desired value. The mixed gas introduced into the cylinder is ignited by an ignition plug 6 controlled by a signal from ECU 11 and combusted. The combustion exhaust gas is led to the exhaust gas purification system. The exhaust gas purification system is provided by the exhaust gas purification catalyst 10, which eliminates NOx, HC and CO in the exhaust gas by its ternary catalyst function during the stoichiometric operation, and eliminates NOx by the NOx capturing function and also eliminates HC and CO by the combustion function at the same time during the lean operation. The NOx elimination activity of the exhaust gas purification catalyst is always determined during the lean operation by the judgement of EUC and control signals to shift the air/fuel ratio, etc. to the fuel-rich state during the combustion, when the NOx elimination activity is lowered, thereby regaining the NOx capturing action of the catalyst. By the foregoing operations, the exhaust gas can be effectively purified under all the engine combustion conditions of lean operation and stoichiometric operation (including the fuel-rich operation). An A/F sensor can be used in place of the oxygen concentration sensor 7.

Figure 2:
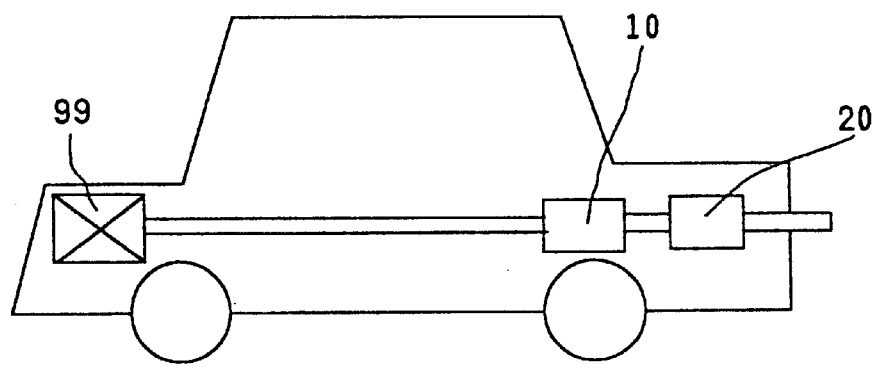
FIG. 2 is a view showing an NOx elimination catalyst and a combustion catalyst provided in an exhaust gas passage from an automobile engine.

FIG. 2 shows the case of providing a hydrocarbon and CO combustion catalyst downstream of the exhaust gas purification catalyst 10. In FIG. 2, the remaining hydrocarbon and CO as not eliminated by the exhaust gas purification catalyst are eliminated by the combustion catalyst 20.

The present invention will be described in detail below, referring to Examples, which are not limitative of the present invention.

EXAMPLE 1

A cordierite honeycomb (400 cells/inc$^2$) was coated with a slurry prepared from alumina powder and alumina precursor and made acidic by nitric acid, dried and fired to obtain an alumina coat honeycomb as coated with 1.5 moles of alumina per 1 l of the apparent honeycomb volume. The alumina coat honeycomb was impregnated with a mixed solution of dinitrodiamine Pt nitric acid solution and Rh nitrate solution, dried at 200° C. and then fired at 600° C. Then, the supported Pt and Rh-contained honeycomb was impregnated with a mixed solution of Na nitrate solution, Mn nitrate solution and Pd nitrate solution, dried at 200° C. and then fired at 600° C. Thus, Example catalyst 1 containing 0.0022 parts by mole of Rh, 0.014 parts by mole of Pt, 0.8 parts by mole of Na, 0.2 parts by mole of Mn and 0.014 parts by mole of Pd in terms of metal elements on the basis of 1.5 parts by mole of alumina was prepared. The catalyst will be hereinafter expressed as 0.8 NaMnPd-RhPt/Al$_2$O$_3$. Likewise, Example Catalysts 2 to 9, which contained 0.8 parts by mole each of Li, K, Rb, Cs, Mg, Ca, Sr and Ba, respectively, as supported in place of Na, while changing the amounts of supported Mn, Pd, Rh and Pt, and Example Catalysts 10 to 41 containing at least two members of alkali metals and alkaline earth metals without changing the amounts of supported Mn, Pd, Rh and Pt were prepared. In the same manner as for Example Catalyst 1, Comparative Example Catalysts 1 to 9 containing 0.0022 parts by mole of Rh, 0.014 parts by mole of Pt, 0.014 parts by mole of Pd and 0.8 parts by mole of each of Na, Li, K, Rb, Cs, Mg, Ca, Sr and Ba in terms of metal elements respectively, as supported on the basis of 1.5 parts by mole of alumina, without containing Mn, and likewise Comparative Example Catalysts 10 to 14 containing at least two members of alkali metals and alkaline earth metals without containing Mn and without changing the amounts of supported Pd, Rh and Pt, were prepared as Comparative Example Catalysts.

TEST EXAMPLE 1

(Test Procedure)

The foregoing catalysts were subjected to an NOx elimination test under the following conditions.

6 cc of the honeycomb catalyst was set into a quartz glass reactor tube. The reactor tube was inserted into an electric furnace and heat controlled so that the gas introduced into the reactor tube could be set to temperatures of 300° C., 400° C. and 500° C. The following gases were introduced into the reactor tube: a model gas, i.e. an assumed exhaust gas as would be emitted from an automobile engine operated in the theoretical air/fuel ratio (which will be hereinafter referred to as "stoichiometric model gas") and a model gas, i.e. an assumed exhaust gas as would be emitted from a lean-burn operated automobile engine (which will be hereinafter referred to as "lean model gas"), where these two model gases were introduced into the reactor tube upon switching from one to another at every 3 minutes. The stoichiometric model gas had such a composition as NOx: 1,000 ppm, $C_3H_6$: 600 ppm, CO: 0.6%, $CO_2$: 12%, $O_2$: 0.5%, $H_2$: 0.3%, $H_2O$: 10%, and $N_2$: the balance. The lean model gas had such a composition as NOx: 600 ppm, $C_3H_6$: 500 ppm, CO: 0.1%, $CO_2$: 10%, $O_2$: 5%, $H_2O$: 10% and $N_2$: the balance. NOx concentration was measured at the inlet to and the outlet from the catalyst, and NOx elimination efficiency one minute after switching to the lean model gas was calculated according to the following equation:

NOx elimination efficiency (%)=(NOx concentration of inlet gas− NOx concentration of outlet gas)÷NOx concentration of inlet gas×100

Test for determining the NOx elimination efficiency as mentioned above will be referred to as Test Example 1.

(Test Results)

Test results of Example Catalysts 1 to 41 and Comparative Catalysts 1 to 14 according to Test Example 1 are shown in Table 1. In the fuel-rich burn operation, all the catalysts constantly had an NOx elimination efficiency of 90% or more at 300° C. and 100% at 400° C., showing the satisfactory ternary catalyst activity. In case of the present catalysts, the NOx elimination efficiency was not changed during both of the lean-burn operation and the stoichiometric burn operation even after a plurality of switched operations. The HC and CO elimination efficiency during the lean-burn operation was 90% or more. Example Catalyst containing at least one member of alkali metals and alkaline earth metals, and all of Mn and Rh, Pt and Pd LIE had evidently higher NOx elimination efficiencies than those of Comparative Example Catalysts.

TABLE 1

| Catalyst | | NOx elimination efficiency (%) | | |
| --- | --- | --- | --- | --- |
| | | 300° C. | 400° C. | 500° C. |
| Example Catalyst 1 | 0.8NaMnPd—RhPt/Al2O3 | 88 | 92 | 87 |
| Example Catalyst 2 | 0.8LiMnPd—RhPt/Al$_2$O$_3$ | 86 | 88 | 71 |
| Example Catalyst 3 | 0.8KMnPd—RhPt/Al$_2$O$_3$ | 82 | 96 | 91 |
| Example Catalyst 4 | 0.8RbMnPd—RhPt/Al$_2$O$_3$ | 87 | 97 | 94 |
| Example Catalyst 5 | 0.8CsMnPd—RhPt/Al$_2$O$_3$ | 83 | 99 | 95 |
| Example Catalyst 6 | 0.8MgMnPd—RhPt/Al$_2$O$_3$ | 71 | 85 | 63 |
| Example Catalyst 7 | 0.8CaMnPd—RhPt/Al$_2$O$_3$ | 82 | 93 | 75 |
| Example Catalyst 8 | 0.8SrMnPd—RhPt/Al$_2$O$_3$ | 82 | 92 | 80 |
| Example Catalyst 9 | 0.8BaMnPd—RhPt/Al$_2$O$_3$ | 73 | 71 | 54 |
| Example Catalyst 10 | 0.2Li0.6NaMnPd—RhPt/Al$_2$O$_3$ | 82 | 91 | 73 |
| Example Catalyst 11 | 0.4Li0.4KMnPd—RhPt/Al$_2$O$_3$ | 85 | 94 | 92 |
| Example Catalyst 12 | 0.4Li0.4RbMnPd—RhPt/Al$_2$O$_3$ | 75 | 77 | 69 |
| Example Catalyst 13 | 0.4Li0.4CsMnPd—RhPt/Al$_2$O$_3$ | 85 | 93 | 91 |
| Example Catalyst 14 | 0.6Li0.1MgMnPd—RhPt/Al$_2$O$_3$ | 72 | 61 | 50 |
| Example Catalyst 15 | 0.4Li0.4CaMnPd—RhPt/Al$_2$O$_3$ | 75 | 91 | 77 |
| Example Catalyst 16 | 0.4Li0.4SrMnPd—RhPt/Al$_2$O$_3$ | 84 | 90 | 75 |
| Example Catalyst 17 | 0.4Li0.4BaMnPd—RhPt/Al$_2$O$_3$ | 72 | 70 | 55 |
| Example Catalyst 18 | 0.8Na0.6KMnPd—RhPt/Al$_2$O$_3$ | 91 | 90 | 93 |
| Example Catalyst 19 | 0.8Na0.4RbMnPd—RhPt/Al$_2$O$_3$ | 85 | 80 | 81 |
| Example Catalyst 20 | 0.8Na0.4CsMnPd—RhPt/Al$_2$O$_3$ | 86 | 90 | 85 |
| Example Catalyst 21 | 0.8Na0.75MgMnPd—RhPt/Al$_2$O$_3$ | 92 | 99 | 94 |
| Example Catalyst 22 | 0.8Na0.4CaMnPd—RhPt/Al$_2$O$_3$ | 80 | 90 | 71 |
| Example Catalyst 23 | 0.4Na0.2SrMnPd—RhPt/Al$_2$O$_3$ | 89 | 87 | 81 |
| Example Catalyst 24 | 0.4K0.2CsMnPd—RhPt/Al$_2$O$_3$ | 95 | 98 | 85 |
| Example Catalyst 25 | 0.4K0.4RbMnPd—RhPt/Al$_2$O$_3$ | 81 | 85 | 73 |
| Example Catalyst 26 | 0.4K0.4CaMnPd—RhPt/Al$_2$O$_3$ | 80 | 80 | 63 |
| Example Catalyst 27 | 0.6K0.4SrMnPd—RhPt/Al$_2$O$_3$ | 82 | 86 | 75 |
| Example Catalyst 28 | 0.6K0.4BaMnPd—RhPt/Al$_2$O$_3$ | 80 | 76 | 77 |
| Example Catalyst 29 | 0.3Cs0.1MgMnPd—RhPt/Al$_2$O$_3$ | 85 | 90 | 85 |
| Example Catalyst 30 | 0.3Cs0.2CaMnPd—RhPt/Al$_2$O$_3$ | 82 | 85 | 80 |
| Example Catalyst 31 | 0.3Cs0.4SrMnPd—RhPt/Al$_2$O$_3$ | 86 | 88 | 75 |
| Example Catalyst 32 | 0.3Cs0.4BaMnPd—RhPt/Al$_2$O$_3$ | 73 | 85 | 80 |
| Example Catalyst 33 | 0.4Sr0.1MgMnPd—RhPt/Al$_2$O$_3$ | 88 | 90 | 82 |
| Example Catalyst 34 | 0.4Sr0.4CaMnPd—RhPt/Al$_2$O$_3$ | 81 | 85 | 78 |
| Example Catalyst 35 | 0.4Sr0.4BaMnPd—RhPt/Al$_2$O$_3$ | 71 | 82 | 77 |
| Example Catalyst 36 | 0.4Li1.2Na0.6KMnPd—RhPt/Al$_2$O$_3$ | 98 | 99 | 91 |
| Example Catalyst 37 | 0.8Na0.2Ca0.1MgMnPd—RhPt/Al$_2$O$_3$ | 80 | 87 | 75 |

TABLE 1-continued

| Catalyst | | NOx elimination efficiency (%) | | |
|---|---|---|---|---|
| | | 300° C. | 400° C. | 500° C. |
| Example Catalyst 38 | 0.4Na0.15Sr0.1MgMnPd—RhPt/Al$_2$O$_3$ | 83 | 88 | 78 |
| Example Catalyst 39 | 0.4Na0.15Sr0.2CaMnPd—RhPt/Al$_2$O$_3$ | 76 | 80 | 70 |
| Example Catalyst 40 | 0.4Li0.4K0.2SrMnPd—RhPt/Al$_2$O$_3$ | 88 | 93 | 90 |
| Example Catalyst 41 | 0.4Li0.4Na0.4K0.2CsMnPd—RhPt/Al$_2$O$_3$ | 95 | 98 | 95 |
| Comp. Ex. Catalyst 1 | 0.8NaPd—RhPt/Al$_2$O$_3$ | 67 | 63 | 35 |
| Comp. Ex. Catalyst 2 | 0.8LiPd—RhPt/Al$_2$O$_3$ | 68 | 51 | 35 |
| Comp. Ex. Catalyst 3 | 0.8KPd—RhPt/Al$_2$O$_3$ | 58 | 57 | 42 |
| Comp. Ex. Catalyst 4 | 0.8RbPd—RhPt/Al$_2$O$_3$ | 40 | 59 | 47 |
| Comp. Ex. Catalyst 5 | 0.8CsPd—RhPt/Al$_2$O$_3$ | 35 | 61 | 50 |
| Comp. Ex. Catalyst 6 | 0.8MgPd—RhPt/Al$_2$O$_3$ | 50 | 38 | 23 |
| Comp. Ex. Catalyst 7 | 0.8CaPd—RhPt/Al$_2$O$_3$ | 58 | 52 | 28 |
| Comp. Ex. Catalyst 8 | 0.8SrPd—RhPt/Al$_2$O$_3$ | 51 | 57 | 36 |
| Comp. Ex. Catalyst 9 | 0.8BaPd—RhPt/Al$_2$O$_3$ | 57 | 51 | 32 |
| Comp. Ex. Catalyst 10 | 8Na0.1MgPd—RhPt/Al$_2$O$_3$ | 52 | 60 | 40 |
| Comp. Ex. Catalyst 11 | 0.4Sr0.4BaPd—RhPt/Al$_2$O$_3$ | 49 | 61 | 29 |
| Comp. Ex. Catalyst 12 | 0.6K0.4BaPd—RhPt/Al$_2$O$_3$ | 55 | 53 | 30 |
| Comp. Ex. Catalyst 13 | 8Na0.2Ca0.1MgPd—RhPt/Al$_2$O$_3$ | 51 | 55 | 40 |
| Comp. Ex. Catalyst 14 | 0.4Na0.15Sr0.2CaPd—RhPt/Al$_2$O$_3$ | 54 | 49 | 36 |

TEST EXAMPLE 2

(Test Procedure)

Example Catalyst 1, 3, 8, 11, 18, 21, 33, 36, 38 and 40, and Comparative Example Catalyst 1 to 5, 11 and 13 were fired at 800° C. for 5 hours, and then subjected to the test in the same test procedure as Test Example 1.

(Test Results)

Test results are shown in Table 2. The present catalysts had evidently higher NOx elimination efficiencies than those of Comparative Example Catalysts and had distinguished high temperature durabilities.

TABLE 2

| Catalyst | | NOx elimination efficiency (%) | | |
|---|---|---|---|---|
| | | 300° C. | 400° C. | 500° C. |
| Example Catalyst 1 | 0.8NaMnPd—RhPt/Al$_2$O$_3$ | 73 | 85 | 73 |
| Example Catalyst 3 | 0.8KMnPd—RhPt/Al$_2$O$_3$ | 75 | 80 | 70 |
| Example Catalyst 8 | 0.8SrMnPd—RhPt/Al$_2$O$_3$ | 78 | 80 | 69 |
| Example Catalyst 11 | 0.4Li0.4KMnPd—RhPt/Al$_2$O$_3$ | 80 | 85 | 84 |
| Example Catalyst 18 | 0.8Na0.6KMnPd—RhPt/Al$_2$O$_3$ | 79 | 82 | 87 |
| Example Catalyst 21 | 0.8Na0.075MgMnPd—RhPt/Al$_2$O$_3$ | 88 | 91 | 89 |
| Example Catalyst 33 | 0.4Sr0.1MgMnPd—RhPt/Al$_2$O$_3$ | 72 | 79 | 69 |
| Example Catalyst 36 | 0.4Li1.2Na0.6KMnPd—RhPt/Al$_2$O$_3$ | 83 | 93 | 88 |
| Example Catalyst 38 | 0.4Na0.15Sr0.1MgMnPd—RhPt/Al$_2$O$_3$ | 75 | 81 | 72 |

TABLE 2-continued

| Catalyst | | NOx elimination efficiency (%) | | |
|---|---|---|---|---|
| | | 300° C. | 400° C. | 500° C. |
| Example Catalyst 40 | 0.4Li0.4K0.2SrMnPd—RhPt/Al$_2$O$_3$ | 80 | 76 | 69 |
| Comp. Ex. Catalyst 1 | 0.8NaPd—RhPt/Al$_2$O$_3$ | 41 | 40 | 15 |
| Comp. Ex. Catalyst 2 | 0.8LiPd—RhPt/Al$_2$O$_3$ | 35 | 39 | 21 |
| Comp. Ex. Catalyst 3 | 0.8KPd—RhPt/Al$_2$O$_3$ | 45 | 48 | 35 |
| Comp. Ex. Catalyst 4 | 0.8RbPd—RhPt/Al$_2$O$_3$ | 33 | 49 | 34 |
| Comp. Ex. Catalyst 5 | 0.8CsPd—RhPt/Al$_2$O$_3$ | 35 | 33 | 21 |
| Comp. Ex. Catalyst 11 | 0.4Sr0.4BaPd—RhPt/Al$_2$O$_3$ | 24 | 40 | 22 |
| Comp. Ex. Catalyst 13 | 0.8Na0.2Ca0.1MgPd—RhPt/Al$_2$O$_3$ | 38 | 40 | 31 |

EXAMPLE 2

In the same manner as in Example 1, Example Catalysts 42 to 47 were prepared by adding Cu, Co or Ni to Example Catalysts 21 and 36, respectively, and evaluated according to Test Example 1. Amounts of supported cu, Co and Ni were 0.1 part by mole each in terms of metal elements on the basis of 1.5 parts by mole of alumina.

(Test Results)

Test results are shown in Table 3. Example Catalysts containing Co, Ni or Cu had higher activities than those of Comparative Example Catalysts 1 to 14 shown in Table 1.

TABLE 3

| Catalyst | | NOx elimination efficiency (%) | | |
|---|---|---|---|---|
| | | 300° C. | 400° C. | 500° C. |
| Example Catalyst 42 | NaMgMnPd—RhPt0.1Cu/Al$_2$O$_3$ | 93 | 99 | 96 |
| Example Catalyst 43 | NaMgMnPd—RhPt0.1Co/Al$_2$O$_3$ | 94 | 99 | 95 |
| Example Catalyst 44 | NaMgMnPd—RhPt0.1Ni/Al$_2$O$_3$ | 95 | 99 | 97 |
| Example Catalyst 45 | LiNaKMnPd—RhPt0.1Cu/Al$_2$O$_3$ | 87 | 95 | 93 |
| Example Catalyst 46 | LiNaKMnPd—RhPt0.1Co/Al$_2$O$_3$ | 86 | 96 | 94 |
| Example Catalyst 47 | LiNaKMnPd—RhPt0.1Ni/Al$_2$O$_3$ | 84 | 99 | 93 |

EXAMPLE 3

In the same manner as in Example 1, Example Catalysts 48 to 51 were prepared by adding Ti or Si to Example Catalysts 21 and 36, respectively. Amounts of supported Ti and Si were 0.1 parts by mole each in terms of metal elements on the basis of 1.5 parts by mole of alumina.

TEST EXAMPLE 3

(Test Procedure)

In Test Example 1, only an SO$_2$-added lean gas was passed through the reaction tube. An amount of SO$_2$ added to the lean gas was 0.01%. Then, an NOx elimination efficiency was determined according to the procedure of Test Example 1. Test temperature was 400° C.

(Test Results)

Test results of Example Catalysts 48 to 51 and Comparative Example Catalysts 1 and 3 according to Test Example 3 are shown in Table 4. Example Catalysts 48 to 51 had higher NOx elimination efficiencies than those of Comparative Example Catalysts 1 and 3 and also had a good SOx durability.

TABLE 4

| Catalyst | | NOx elimination efficiency (%) | | |
|---|---|---|---|---|
| | | 300° C. | 400° C. | 500° C. |
| Example Catalyst 48 | NaMgMnPd0.1Ti—RhPt/Al$_2$O$_3$ | 61 | 68 | 58 |
| Example Catalyst 49 | NaMgMnPd0.1Si—RhPt/Al$_2$O$_3$ | 59 | 62 | 55 |
| Example Catalyst 50 | LiNaKMnPd0.1Ti—RhPt/Al$_2$O$_3$ | 70 | 75 | 71 |
| Example Catalyst 51 | LiNaKMnPd0.1Si—RhPt/Al$_2$O$_3$ | 65 | 70 | 58 |
| Comp. Ex. Catalyst 1 | 0.8NaPd—RhPt/Al$_2$O$_3$ | 28 | 32 | 15 |
| Comp. Ex. Catalyst 3 | 0.8KPd—RhPt/Al$_2$O$_3$ | 20 | 24 | 32 |

EXAMPLE 4

In the same manner as in Example 1, Example Catalysts 52 to 60 were prepared by adding 0.2 parts by mole of Ce, La or Nd in terms of metal elements to Example Catalysts 36, 48 and 50, respectively, on the basis of 1.5 parts by mole of alumina. Test was the same as in Test Example 2.

(Test Results)

NOx elimination efficiencies determined according to Test Example 2 are shown in Table 5. Example Catalysts 52 to 60 had evidently higher NOx elimination efficiencies than those of Comparative Example Catalysts shown in Table 2 and had good high temperature durabilities.

TABLE 5

| Catalyst | | NOx elimination efficiency (%) | | |
|---|---|---|---|---|
| | | 300° C. | 400° C. | 500° C. |
| Example Catalyst 52 | LiNaKMnPd—RhPt-0.2Ce/Al$_2$O$_3$ | 88 | 95 | 91 |
| Example Catalyst 53 | LiNaKMnPd—RhPt-0.2La/Al$_2$O$_3$ | 83 | 96 | 89 |
| Example Catalyst 54 | LiNaKMnPd—RhPt-0.2Nd/Al$_2$O$_3$ | 85 | 93 | 90 |
| Example Catalyst 55 | NaMgMnPdTi—RhPt-0.2Ce/Al$_2$O$_3$ | 93 | 95 | 85 |
| Example Catalyst 56 | NaMgMnPdTi—RhPt-0.2La/Al$_2$O$_3$ | 88 | 92 | 87 |
| Example Catalyst 57 | NaMgMnPdTi—RhPt-0.2Nd/Al$_2$O$_3$ | 90 | 91 | 91 |
| Example Catalyst 58 | LiNaKMnPdTi—RhPt-0.2Ce/Al$_2$O$_3$ | 95 | 97 | 94 |
| Example Catalyst 59 | LiNaKMnPdTi—RhPt-0.2La/Al$_2$O$_3$ | 82 | 91 | 91 |
| Example Catalyst 60 | LiNaKMnPdTi—RhPt-0.2Nd/Al$_2$O$_3$ | 80 | 91 | 80 |

EXAMPLE 5

In the same manner as in Example 1, Example Catalysts 61 to 66; were prepared by omitting one of the noble metals from Example Catalysts 52 and 58. Test was the same as in Test Example 2.

(Test Results)

NOx elimination efficiencies determined according to Test Example 2 are shown in Table 6. Example Catalysts 61 to 66 had evidently higher NOx elimination efficiencies than those of Comparative Example catalysts shown in Table 2 and had good high temperature durabilities.

TABLE 6

| Catalyst | | NOx elimination efficiency (%) | | |
|---|---|---|---|---|
| | | 300° C. | 400° C. | 500° C. |
| Example Catalyst 61 | LiNaKMnPd—Pt—Ce/Al$_2$O$_3$ | 79 | 86 | 73 |
| Example Catalyst 62 | LiNaKMnPd—RhCe/Al$_2$O$_3$ | 73 | 86 | 77 |

TABLE 6-continued

| Catalyst | | NOx elimination efficiency (%) | | |
|---|---|---|---|---|
| | | 300° C. | 400° C. | 500° C. |
| Example Catalyst 63 | LiNaKMn—RhPt—Ce/Al$_2$O$_3$ | 70 | 86 | 80 |
| Example Catalyst 64 | LiNaKMnPdTi—Pt—Ce/Al$_2$O$_3$ | 86 | 90 | 78 |
| Example Catalyst 65 | LiNaKMnPdTi—Rh—Ce/Al$_2$O$_3$ | 89 | 90 | 80 |
| Example Catalyst 66 | LiNaKMnTi—RhPt—Ce/Al$_2$O$_3$ | 79 | 91 | 83 |

EXAMPLE 6

In the same manner as in Example 1, Example Catalysts 67 to 72 were prepared by adding 0.1 part by mole of at least one of P and B in terms of elements to Example Catalysts 52 and 58, respectively, on the basis of 1.5 parts by mole of alumina. Test was the same as in Test Example 2.

(Test Results)

NOx elimination efficiencies determined according to Test Example 2 are shown in Table 7. Example Catalysts 67 to 72 had higher NOx elimination efficiencies than those of Comparative Example Catalysts shown in Table 2 and had good high temperature durabilities.

TABLE 7

| Catalyst | | NOx elimination efficiency (%) | | |
|---|---|---|---|---|
| | | 300° C. | 400° C. | 500° C. |
| Example Catalyst 67 | LiNaKMnPd0.1P—RhPt—Ce/Al$_2$O$_3$ | 88 | 87 | 94 |
| Example Catalyst 68 | LiNaKMnPd0.1B—RhPt—Ce/Al$_2$O$_3$ | 83 | 82 | 95 |
| Example Catalyst 69 | LiNaKMnPd0.1P0.1B—RhPt—Ce/Al$_2$O$_3$ | 85 | 81 | 92 |
| Example Catalyst 70 | LiNaKMnPdTi0.1P—RhPt—Ce/Al$_2$O$_3$ | 81 | 93 | 92 |
| Example Catalyst 71 | LiNaKMnPdTi0.1B—RhPt—Ce/Al$_2$O$_3$ | 80 | 83 | 87 |
| Example Catalyst 72 | LiNaKMnPdTi0.1P0.1B—RhPt—Ce/Al$_2$O$_3$ | 80 | 86 | 97 |

EXAMPLE 7

In the same manner as in Example 1, Catalysts containing 0.1 part by mole of Ti in terms of metal element on the basis of 1.5 parts by mole of alumina were prepared by adding Ti to Example Catalysts 11 and 33 and catalysts were also prepared by changing Mn contents of Example Catalysts 36 and 48. Test was the same as in Test Example 1.

(Test Results)

NOx elimination efficiencies determined at 400° C. according to Test Example 1 are shown in Table 8. The catalysts containing 0.05 to 2 parts by mole of supported Mn in terms of metal element had high NOx elimination efficiencies than 80%, showing good NOx elimination efficiencies.

TABLE 8

| Catalysts | NOx elimination efficiency (%), 400° C. | Catalysts | NOx elimination efficiency (%), 400° C. |
|---|---|---|---|
| LiKPdTi—RhPt/$Al_2O_3$ | 73 | LiNaKPd—RhPt/$Al_2O_3$ | 70 |
| LiK0.02MnPdTi—RhPt/$Al_2O_3$ | 75 | LiNaK0.02MnPd—RhPt/$Al_2O_3$ | 75 |
| LiK0.05MnPdTi—RhPt/$Al_2O_3$ | 83 | LiNaK0.05MnPd—RhPt/$Al_2O_3$ | 82 |
| LiK0.2MnPdTi—RhPt/$Al_2O_3$ | 92 | LiNaK0.2MnPd—RhPt/$Al_2O_3$ | 99 |
| LiK0.4MnPdTi—RhPt/$Al_2O_3$ | 98 | LiNaK0.4MnPd—RhPt/$Al_2O_3$ | 99 |
| LiK1.4MnPdTi—RhPt/$Al_2O_3$ | 90 | LiNaK1.4MnPdRhPt/$Al_2O_3$ | 93 |
| LiK2MnPdTi—RhPt/$Al_2O_3$ | 82 | LiNaK2MnPd—RhPt/$Al_2O_3$ | 86 |
| LiK3MnPdTi—RhPt/$Al_2O_3$ | 68 | LiNaK3MnPd—RhPt/$Al_2O_3$ | 71 |
| SrMgPdTi—RhPt/$Al_2O_3$ | 69 | NaMgPdTi—RhPt/$Al_2O_3$ | 71 |
| SrMg0.02MnPdTi—RhPt/$Al_2O_3$ | 75 | NaMg0.02MnPdTi—RhPt/$Al_2O_3$ | 73 |
| SrMg0.05MnPdTi—RhPt/$Al_2O_3$ | 81 | NaMg0.05MnPdTi—RhPt/$Al_2O_3$ | 81 |
| SrMg0.2MnPdTi—RhPt/$Al_2O_3$ | 85 | NaMg0.2MnPdTi—RhPt/$Al_2O_3$ | 96 |
| SrMg0.4MnPdTi—RhPt/$Al_2O_3$ | 93 | NaMg0.4MnPdTi—RhPt/$Al_2O_3$ | 93 |
| SrMg1.4MnPdTi—RhPt/$Al_2O_3$ | 88 | NaMg1.4MnPdTi—RhPt/$Al_2O_3$ | 88 |
| SrMg2MnPdTi—RhPt/$Al_2O_3$ | 83 | NaMg2MnPdTi—RhPt/$Al_2O_3$ | 83 |
| SrMg3MnPdTi—RhPt/$Al_2O_3$ | 62 | NaMg3MnPdTi—RhPt/$Al_2O_3$ | 65 |

EXAMPLE 8

In the same manner as in Example 1, catalysts containing 0.1 part by mole of Ti in terms of metal element on the basis of 1.5 parts by mole of alumina were prepared by adding Ti to Example Catalysts 11 and 33, and catalysts whose K and Sr contents were further changed in the prepared catalysts and catalysts whose K and Na contents were changed in Example Catalysts 36 and 48 were also prepared. Test was the same as in Test Example 1.

(Test Results)

NOx elimination efficiencies determined at 400° C. according to Test Example 1 are shown in Table 9. The catalysts having K, Sr and Na contents of 0.05 to 3 parts by mole each had higher NOx elimination efficiencies than 80% at 400° C., showing good NOx elimination efficiencies.

EXAMPLE 9

In the same manner as in Example 1, catalysts whose Rh, Pt and Pd contents were changed in Example Catalyst 48 were prepared. Test was the same as in Test Example 1.

(Test Results)

NOx elimination efficiencies determined at 400° C. according to Test Example 1 are shown in Table 10. The catalysts containing 0.002 to 0.05 parts by mole of Pt, 0.0003 to 0.01 part by mole of Rh and 0.001 to 0.2 parts by mole of Pd in terms of metal elements as amounts of supported Rh, Pt and Pd had higher NOx elimination efficiencies than 80% at 400° C., showing good Nox elimination efficiencies.

TABLE 9

| Catalysts | NOx elimination efficiency (%), 400° C. | Catalysts | NOx elimination efficiency (%), 400° C. |
|---|---|---|---|
| Li0.02KMnPdTi—RhPt/$Al_2O_3$ | 72 | LiNa0.02KMnPd—RhPt/$Al_2O_3$ | 70 |
| Li0.05KMnPdTi—RhPt/$Al_2O_3$ | 81 | LiNa0.05KMnPd—RhPt/$Al_2O_3$ | 84 |
| Li0.4KMnPdTi—RhPt/$Al_2O_3$ | 92 | LiNa0.4KMnPd—RhPt/$Al_2O_3$ | 99 |
| Li1.5KMnPdTi—RhPt/$Al_2O_3$ | 96 | LiNa0.6KMnPd—RhPt/$Al_2O_3$ | 99 |
| Li2.2KMnPdTi—RhPt/$Al_2O_3$ | 89 | LiNa1.5KMnPd—RhPt/$Al_2O_3$ | 90 |
| Li3KMnPdTi—RhPt/$Al_2O_3$ | 83 | LiNa3KMnPd—RhPt/$Al_2O_3$ | 82 |
| Li4KMnPdTi—RhPt/$Al_2O_3$ | 69 | LiNa4KMnPd—RhPt/$Al_2O_3$ | 73 |
| 0.02SrMgMnPdTi—RhPt/$Al_2O_3$ | 73 | 0.02NaMgMnPdTi—RhPt/$Al_2O_3$ | 62 |
| 0.05SrMgMnPdTi—RhPt/$Al_2O_3$ | 81 | 0.5NaMgMnPdTi—RhPt/$Al_2O_3$ | 81 |
| 0.4SrMgMnPdTi—RhPt/$Al_2O_3$ | 85 | 0.05NaMgMnPdTi—RhPt/$Al_2O_3$ | 88 |
| 0.6SrMgMnPdTi—RhPt/$Al_2O_3$ | 88 | 0.8NaMgMnPdTi—RhPt/$Al_2O_3$ | 96 |
| 1.5SrMgMnPdTi—RhPt/$Al_2O_3$ | 83 | 2NaMgMnPdTi—RhPt/$Al_2O_3$ | 90 |
| 3SrMgMnPdTi—RhPt/$Al_2O_3$ | 81 | 3NaMgMnPdTi—RhPt/$Al_2O_3$ | 84 |
| 4SrMgMnPdTi—RhPt/$Al_2O_3$ | 62 | 4NaMgMnPdTi—RhPt/$Al_2O_3$ | 76 |

TABLE 10

| Catalysts | NOx elimination efficiency (%), 400° C. | Catalysts | NOx elimination efficiency (%), 400° C. |
|---|---|---|---|
| NaMgMn0.001PdTi—0.0003Rh0.001Pt/Al$_2$O$_3$ | 60 | NaMgMn0.014PdTi-0.0003Rh0.001Pt/Al$_2$O$_3$ | 76 |
| NaMgMn0.001PdTi-0.01Rh0.001Pt/Al$_2$O$_3$ | 68 | NaMgMn0.014PdTi-0.01Rh0.001Pt/Al$_2$O$_3$ | 74 |
| NaMgMn0.001PdTi-0.0001Rh0.002Pt/Al$_2$O$_3$ | 62 | NaMgMn0.014PdTi-0.0001Rh0.002Pt/Al$_2$O$_3$ | 73 |
| NaMgMn0.001PdTi-0.0003Rh0.002Pt/Al$_2$O$_3$ | 84 | NaMgMn0.014PdTi-0.0003Rh0.002Pt/Al$_2$O$_3$ | 83 |
| NaMgMn0.001PdTi-0.0022Rh0.002Pt/Al$_2$O$_3$ | 90 | NaMgMn0.014PdTi-0.0022Rh0.002Pt/Al$_2$O$_3$ | 92 |
| NaMgMn0.001PdTi-0.01Rh0.002Pt/Al$_2$O$_3$ | 81 | NaMgMn0.014PdTi-0.01Rh0.002Pt/Al$_2$O$_3$ | 84 |
| NaMgMn0.001PdTi-0.02Rh0.002Pt/Al$_2$O$_3$ | 73 | NaMgMn0.014PdTi-0.02Rh0.002Pt/Al$_2$O$_3$ | 76 |
| NaMgMn0.001PdTi-0.0003Rh0.014Pt/Al$_2$O$_3$ | 85 | NaMgMn0.014PdTi-0.0003Rh0.014Pt/Al$_2$O$_3$ | 86 |
| NaMgMn0.001PdTi-0.0022Rh0.014Pt/Al$_2$O$_3$ | 95 | NaMgMn0.014PdTi-0.0022Rh0.014Pt/Al$_2$O$_3$ | 96 |
| NaMgMn0.001PdTi-0.01Rh0.014Pt/Al$_2$O$_3$ | 84 | NaMgMn0.014PdTi-0.01Rh0.014Pt/Al$_2$O$_3$ | 87 |
| NaMgMn0.001PdTi-0.0001Rh0.05Pt/Al$_2$O$_3$ | 75 | NaMgMn0.014PdTi-0.0001Rh0.05Pt/Al$_2$O$_3$ | 75 |
| NaMgMn0.001PdTi-0.0003Rh0.05Pt/Al$_2$O$_3$ | 81 | NaMgMn0.014PdTi-0.0003Rh0.05Pt/Al$_2$O$_3$ | 82 |
| NaMgMn0.001PdTi-0.0022Rh0.05Pt/Al$_2$O$_3$ | 88 | NaMgMn0.014PdTi-0.0022Rh0.05Pt/Al$_2$O$_3$ | 95 |
| NaMgMn0.001PdTi-0.01Rh0.05Pt/Al$_2$O$_3$ | 84 | NaMgMn0.014PdTi-0.01Rh0.05Pt/Al$_2$O$_3$ | 88 |
| NaMgMn0.001PdTi-0.02Rh0.05Pt/Al$_2$O$_3$ | 75 | NaMgMn0.014PdTi-0.02Rh0.05Pt/Al$_2$O$_3$ | 75 |
| NaMgMn0.001PdTi—0.0003Rh0.07Pt/Al$_2$O$_3$ | 72 | NaMgMn0.014PdTi-0.0003Rh0.07Pt/Al$_2$O$_3$ | 73 |
| NaMgMn0.001PdTi-0.01Rh0.07Pt/Al$_2$O$_3$ | 73 | NaMgMn0.014PdTi-0.01Rh0.07Pt/Al$_2$O$_3$ | 71 |
| NaMgMn0.2PdTi-0.0003Rh0.001Pt/Al$_2$O$_3$ | 63 | NaMgMn0.2PdTi-0.0001Rh0.05Pt/Al$_2$O$_3$ | 74 |
| NaMgMn0.2PdTi-0.01Rh0.001Pt/Al$_2$O$_3$ | 66 | NaMgMn0.2PdTi-0.0003Rh0.05Pt/Al$_2$O$_3$ | 82 |
| NaMgMn0.2PdTi—0.0001Rh0.002Pt/Al$_2$O$_3$ | 68 | NaMgMn0.2PdTi-0.0022Rh0.05Pt/Al$_2$O$_3$ | 88 |
| NaMgMn0.2PdTi-0.0003Rh0.002Pt/Al$_2$O$_3$ | 81 | NaMgMn0.2PdTi-0.01Rh0.05Pt/Al$_2$O$_3$ | 81 |
| | | NaMgMn0.2PdTi-0.02Rh0.05Pt/Al$_2$O$_3$ | 77 |
| NaMgMn0.2PdTi-0.0022Rh0.002Pt/Al$_2$O$_3$ | 90 | | |
| NaMgMn0.2PdTi-0.01Rh0.002Pt/Al$_2$O$_3$ | 83 | NaMgMn0.2PdTi-0.0003Rh0.07Pt/Al$_2$O$_3$ | 76 |
| NaMgMn0.2PdTi-0.02Rh0.002Pt/Al$_2$O$_3$ | 71 | NaMgMn0.2PdTi-0.01Rh0.07Pt/Al$_2$O$_3$ | 78 |
| NaMgMn0.2PdTi-0.0003Rh0.014Pt/Al$_2$O$_3$ | 84 | | |
| NaMgMn0.2PdTi-0.022Rh0.014Pt/Al$_2$O$_3$ | 93 | NaMgMn0.0005PdTi-0.0022Rh0.014Pt/Al$_2$O$_3$ | 70 |
| NaMgMn0.2PdTi-0.01Rh0.014Pt/Al$_2$O$_3$ | 87 | NaMgMn0.3PdTi-0.0022Rh0.014Pt/Al$_2$O$_3$ | 71 |

EXAMPLE 10

In the same manner as in Example 1, catalysts were prepared by adding Ce, La or Nd to Example Catalysts 36 and 48 and by further changing their contents. Test was the same as in Test Example 2.

(Test Results)

NOx elimination efficiencies determined at 400° C. according to Test Example 2 are shown in Table 11. The catalysts containing 0.02 to 0.5 parts by mole of supported Ce, La and Nd in terms of metal elements had higher NOx elimination efficiencies than 80% at 400° C. after heating at 800° C. for 5 hours, showing good NOx elimination efficiencies.

EXAMPLE 11

In the same manner as in Example 1, catalysts were prepared by adding Cu, Co or Ni to Example Catalysts 36 and 48 and by further changing their contents.

(Test Results)

NOx elimination efficiencies determined at 400° C. according to Test Example 1 are shown in Table 12. The catalysts containing 0.01 to 2 parts by mole of Cu, Co or Ni in terms of metal elements had higher NOx elimination efficiencies than 80% at 400° C., showing good NOx elimination efficiencies.

TABLE 11

| Catalysts | NOx elimination efficiency (%), 400° C. | Catalysts | NOx elimination efficiency (%), 400° C. |
|---|---|---|---|
| LiNaKMnPd—RhPt-0.01Ce/Al$_2$O$_3$ | 75 | NaMgMnPdTi—RhPt-0.01Ce/Al$_2$O$_3$ | 76 |
| LiNaKMnPd—RhPt-0.02Ce/Al$_2$O$_3$ | 82 | NaMgMnPdTi—RhPt-0.02Ce/Al$_2$O$_3$ | 87 |
| LiNaKMnPd—RhPt-0.2Ce/Al$_2$O$_3$ | 95 | NaMgMnPdTi—RhPt-0.2Ce/Al$_2$O$_3$ | 95 |
| LiNaKMnPd—RhPt-0.5Ce/Al$_2$O$_3$ | 91 | NaMgMnPdTi—RhPt-0.5Ce/Al$_2$O$_3$ | 94 |
| LiNaKMnPd—RhPt-0.8Ce/Al$_2$O$_3$ | 73 | NaMgMnPdTi—RhPt-0.8Ce/Al$_2$O$_3$ | 71 |
| LiNaKMnPd—RhPt-0.01La/Al$_2$O$_3$ | 75 | NaMgMnPdTi—RhPt-0.01La/Al$_2$O$_3$ | 76 |
| LiNaKMnPd—RhPt-0.02La/Al$_2$O$_3$ | 85 | NaMgMnPdTi—RhPt-0.02La/Al$_2$O$_3$ | 85 |
| LiNaKMnPd—RhPt-0.2La/Al$_2$O$_3$ | 96 | NaMgMnPdTi—RhPt-0.2La/Al$_2$O$_3$ | 92 |
| LiNaKMnPd—RhPt-0.5La/Al$_2$O$_3$ | 88 | NaMgMnPdTi—RhPt-0.5La/Al$_2$O$_3$ | 82 |
| LiNaKMnPd—RhPt-0.8La/Al$_2$O$_3$ | 74 | NaMgMnPdTi—RhPt-0.8La/Al$_2$O$_3$ | 63 |
| LiNaKMnPd—RhPt-0.01Nd/Al$_2$O$_3$ | 66 | NaMgMnPdTi—RhPt-0.01Nd/Al$_2$O$_3$ | 70 |
| LiNaKMnPd—RhPt-0.02Nd/Al$_2$O$_3$ | 81 | NaMgMnPdTi—RhPt-0.2Nd/Al$_2$O$_3$ | 82 |
| LiNaKMnPd—RhPt-0.2Nd/Al$_2$O$_3$ | 93 | NaMgMnPdTi—RhPt-0.2Nd/Al$_2$O$_3$ | 91 |
| LiNaKMnPd—RhPt-0.5Nd/Al$_2$O$_3$ | 84 | NaMgMnPdTi—RhPt-0.5Nd/Al$_2$O$_3$ | 84 |
| LiNaKMnPd—RhPt-0.8Nd/Al$_2$O$_3$ | 69 | NaMgMnpdTi—RhPt-0.8Nd/Al$_2$O$_3$ | 75 |

TABLE 12

| Catalysts | NOx elimination efficiency (%), 400° C. | Catalysts | NOx elimination efficiency (%), 400° C. |
|---|---|---|---|
| LiNaKMnPd—RhPt-0.005Cu/Al$_2$O$_3$ | 75 | NaMgMnPdTi—RhPt-0.005Cu/Al$_2$O$_3$ | 76 |
| LiNaKMnPd—RhPt-0.01Cu/Al$_2$O$_3$ | 85 | NaMgMnPdTi—RhPt-0.01Cu/Al$_2$O$_3$ | 82 |
| LiNaKMnPd—RhPt-0.1Cu/Al$_2$O$_3$ | 92 | NaMgMnPdTi—RhPt-0.1Cu/Al$_2$O$_3$ | 87 |
| LiNaKMnPd—RhPt-0.2Cu/Al$_2$O$_3$ | 96 | NaMgMnPdTi—RhPt-0.2Cu/Al$_2$O$_3$ | 91 |
| LiNaKMnPd—RhPt-2Cu/Al$_2$O$_3$ | 81 | NaMgMnPdTi—RhPt-2Cu/Al$_2$O$_3$ | 83 |
| LiNaKMnPd—RhPt-3Cu/Al$_2$O$_3$ | 70 | NaMgMnPdTi—RhPt-3Cu/Al$_2$O$_3$ | 74 |
| LiNaKMnPd—RhPt-0.005Co/Al$_2$O$_3$ | 71 | NaMgMnPdTi—RhPt-0.005Co/Al$_2$O$_3$ | 71 |
| LiNaKMnPd—RhPt-0.01Co/Al$_2$O$_3$ | 81 | NaMgMnPdTi—RhPt-0.01Co/Al$_2$O$_3$ | 88 |
| LiNaKMnPd—RhPt-0.1Co/Al$_2$O$_3$ | 94 | NaMgMnPdTi—RhPt-0.1Co/Al$_2$O$_3$ | 94 |
| LiNaKMnPd—RhPt-0.2Co/Al$_2$O$_3$ | 97 | NaMgMnPdTi—RhPt-0.2Co/Al$_2$O$_3$ | 98 |
| LiNaKMnPd—RhPt-2Co/Al$_2$O$_3$ | 81 | NaMgMnPdTi—RhPt-2Co/Al$_2$O$_3$ | 83 |
| LiNaKMnPd—RhPt-3Co/Al$_2$O$_3$ | 77 | NaMgMnPdTi—RhPt-3Co/Al$_2$O$_3$ | 71 |
| LiNaKMnPd—RhPt-0.005Ni/Al$_2$O$_3$ | 71 | NaMgMnPdTi—RhPt-0.005Ni/Al$_2$O$_3$ | 74 |
| LiNaKMnPd—RhPt-0.01Ni/Al$_2$O$_3$ | 83 | NaMgMnPdTi—RhPt-0.01Ni/Al$_2$O$_3$ | 81 |
| LiNaKMnPd—RhPt-0.1Ni/Al$_2$O$_3$ | 84 | NaMgMnPdTi—RhPt-0.1Ni/Al$_2$O$_3$ | 82 |
| LiNaKMnPd—RhPt-0.2Ni/Al$_2$O$_3$ | 86 | NaMgMnPdTi—RhPt-0.2Ni/Al$_2$O$_3$ | 83 |
| LiNaKMnPd—RhPt-2Ni/Al$_2$O$_3$ | 83 | NaMgMnPdTi—RhPt-2Ni/Al$_2$O$_3$ | 83 |
| LiNaKMnPd—RhPt-3Ni/Al$_2$O$_3$ | 76 | NaMgMnPdTi—RhPt-3Ni/Al$_2$O$_3$ | 76 |

EXAMPLE 12

In the same manner as in Example 1, catalysts were prepared by adding Ti or Si to Example Catalyst 36 while changing its contents, and also by changing Ti content of Example Catalyst 48 or by adding Si to Example Catalyst48 while changing its content.

(Test Results)

NOx elimination efficiencies determined at 400° C. according to Test Example 3 are shown in Table 13. The catalysts containing 0.01 to 2 parts by mole of supported Ti or Si in terms of metal elements had a higher NOx elimination efficiency than 50% at 400 C after SOx poisoning, showing high NOx elimination efficiencies.

TABLE 13

| Catalysts | NOx elimination efficiency (%), 400° C. | Catalysts | NOx elimination efficiency (%), 400° C. |
|---|---|---|---|
| LiNaKMnPd—0.005Ti—RhPt/Al$_2$O$_3$ | 39 | NaMgMnPd0.005Ti—RhPt/Al$_2$O$_3$ | 43 |
| LiNaKMnPd0.01Ti—RhPt/Al$_2$O$_3$ | 54 | NaMgMnPd0.01Ti—RhPt/Al$_2$O$_3$ | 57 |
| LiNaKMnPd0.1Ti—RhPt/Al$_2$O$_3$ | 75 | NaMgMnPd0.1Ti—RhPt/Al$_2$O$_3$ | 68 |
| LiNaKMnPd0.2Ti—RhPt/Al$_2$O$_3$ | 79 | NaMgMnPd0.2Ti—RhPt/Al$_2$O$_3$ | 76 |
| LiNaKMnPd2Ti—RhPt/Al$_2$O$_3$ | 58 | NaMgMnPd2Ti—RhPt/Al$_2$O$_3$ | 51 |
| LiNaKMnPd3Ti—RhPt/Al$_2$O$_3$ | 43 | NaMgMnPd3Ti—RhPt/Al$_2$O$_3$ | 34 |
| LiNaKMnPd0.005Si—RhPt/Al$_2$O$_3$ | 46 | NaMgMnPd0.005Si-RhPt/Al$_2$O$_3$ | 41 |

TABLE 13-continued

| Catalysts | NOx elimination efficiency (%), 400° C. | Catalysts | NOx elimination efficiency (%), 400° C. |
|---|---|---|---|
| LiNaKMnPd0.01Si—RhPt/$Al_2O_3$ | 64 | NaMgMnPd0.01Si—RhPt/$Al_2O_3$ | 54 |
| LiNaKMnPd0.1Si—RhPt/$Al_2O_3$ | 70 | NaMgMnPd0.1Si—RhPt/$Al_2O_3$ | 62 |
| LiNaKMnPd0.2Si—RhPt/$Al_2O_3$ | 62 | NaMgMnPd0.2Si—RhPt/$Al_2O_3$ | 60 |
| LiNaKMnPd2Si—RhPt/$Al_2O_3$ | 53 | NaMgMnPd2Si—RhPt/$Al_2O_3$ | 56 |
| LiNaKMnPd3Si—RhPt/$Al_2O_3$ | 39 | NaMgMnPd3Si—RhPt/$Al_2O_3$ | 39 |

EXAMPLE 13

In the same manner as in Example 1, catalysts were prepared by changing P and B contents of Example Catalysts 70 and 71. Test was the same as in Test Example 2.
(Test Results)

NOx elimination efficiencies determined at 500° C. according to Test Example 2 are shown in Table 14. The catalyst containing 0.01 to 2 parts by mole of supported P or B in terms of elements on the basis of 1.5 parts by mole of alumina had higher NOx elimination efficiencies than 80% at 500° C. after heating at 800° C. for 5 hours, showing good NOx elimination efficiencies.

EXAMPLE 14

In the same manner as in Example 1, catalysts were prepared by changing only amounts of coating per l of the honeycomb in Example Catalysts 36 and 48 without changing amounts of other supported components on $Al_2O_3$.

(Test Results)

NOx elimination efficiencies determined at 400° C. according to Test Example 1 are shown in Table 15. The catalysts containing 0.3 to 4 moles of $Al_2O_3$ coating/l of honeycomb in terms of $Al_2O_3$ had higher NOx elimination efficiencies than 80% at 400° C., showing good NOx elimination efficiencies.

TABLE 14

| Catalysts | NOx elimination efficiency (%), 400° C. | Catalysts | NOx efficiency elimination (%), 400° C. |
|---|---|---|---|
| LiNaKMnPdTi0.01P—RhPt—Ce/$Al_2O_3$ | 95 | LiNaKMnPdTi0.01B—RhPt—Ce/$Al_2O_3$ | 95 |
| LiNaKMnPdTiP—RhPt—Ce/$Al_2O_3$ | 92 | LiNaKMnPdTi1B—RhPt—Ce/$Al_2O_3$ | 88 |
| LiNaKMnPdTi2P—RhPt—Ce/$Al_2O_3$ | 86 | LiNaKMnPdTi2B—RhPt—Ce/$Al_2O_3$ | 81 |
| LiNaKMnPdTi3P—RhPt—Ce/$Al_2O_3$ | 73 | LiNaKMnPdTi3B—RhPt—Ce/$Al_2O_3$ | 71 |

TABLE 15

| Catalysts | NOx elimination efficiency (%), 400° C. | Catalysts | NOx elimination efficiency (%), 400° C. |
|---|---|---|---|
| LiNaKMnPd—RhPt/0.1$Al_2O_3$ | 64 | NaMgMnPdTi—RhPt/0.1$Al_2O_3$ | 77 |
| LiNaKMnPd—RhPt/0.3$Al_2O_3$ | 82 | NaMgMnPdTi—RhPt/0.3$Al_2O_3$ | 84 |
| LiNaKMnPd—RhPt/1.5$Al_2O_3$ | 99 | NaMgMnPdTi—RhPt/1.5$Al_2O_3$ | 96 |
| LiNaKMnPd—RhPt/3$Al_2O_3$ | 90 | NaMgMnPdTi—RhPt/3$Al_2O_3$ | 84 |
| LiNaKMnPd—RhPt/4$Al_2O_3$ | 86 | NaMgMnPdTi—RhPt/4$Al_2O_3$ | 81 |
| LiNaKMnPd—RhPt/6$Al_2O_3$ | 70 | NaMgMnPdTi—RhPt/6$Al_2O_3$ | 61 |

EXAMPLE 15

As a hydrocarbon and CO combustion catalyst, a catalyst containing only Rh and Pt supported on an alumina coat honeycomb was prepared in the same manner as in Example 1, where Rh and Pt contents were 0.002 parts by mole of Rh and 0.01 part by mole of Pt in terms of metal elements on the basis of 1.5 parts by mole of alumina. Test was the same as in Test Example 1, and hydrocarbon and CO elimination efficiencies were determined by providing the combustion catalyst upstream or downstream of Example Catalyst 36 or 48 or with no provision of the combustion catalyst. Test temperature was 400° C.

(Test Results)

NOx elimination efficiencies determined at 400° C. according to Test Example 1 are shown in Table 16. Hydrocarbon and CO elimination efficiencies were improved by providing the combustion catalyst.

TABLE 16

|  | $C_3H_6$ elimination efficiency (%), 400° C. | CO elimination efficiency (%), 400° C. |
|---|---|---|
| Example Catalyst 36 |  |  |
| Hydrocarbon and CO combustion catalyst not provided | 93 | 94 |
| Hydrocarbon and CO combustion catalyst provided upstream | 98 | 99 |
| Hydrocarbon and CO combustion catalyst provided downstream | 99 | 100 |
| Example Catalyst 48 |  |  |
| Hydrocarbon and CO combustion catalyst not provided | 92 | 94 |
| Hydrocarbon and CO combustion catalyst provided upstream | 99 | 97 |
| Hydrocarbon and CO combustion catalyst provided downstream | 99 | 100 |

As described in detail above, nitrogen oxides can be eliminated with high efficiency in an oxygen excess atmosphere according to the present invention. The present catalyst has distinguished heat resistance and SOx resistance, so that a high elimination activity can be maintained for a long time.

INDUSTRIAL APPLICABILITY

Automobile exhaust gases are now on a trend toward global emission regulation and fuel economy regulation and it is expectable that the market for lean-burn automobiles will surely expand. For the automobile exhaust gas purification catalysts, ternary catalysts have been so far used, but have failed to eliminate NOx contained in the exhaust gases emitted from lean-burn automobiles. The present exhaust gas purification catalyst can eliminate NOx contained in the exhaust gases emitted from the lean-burn automobiles with high elimination efficiency and ensures a very high industrial applicability.

What is claimed is:

1. An internal combustion engine exhaust gas purification process, which comprises
   (i) contacting an exhaust gas emitted from a lean-burn operated internal combustion engine with an exhaust gas purification catalyst placed in a flow route of the exhaust gas to capture NOx contained in the lean-burn exhaust gas, thereby purifying the exhaust gas by reduction of the captured NOx with reducing components contained in the exhaust gas; and
   (ii) temporarily shifting the internal combustion engine from the lean-burn operation to a stoichiometric air/fuel ratio operation or a fuel excess operation, thereby reducing the NOx captured by the exhaust gas purification catalyst without subjecting to reduction during the lean-burn operation with the reducing components contained in the stoichiometric or fuel-rich exhaust gas so as to regenerate the exhaust gas purification catalyst, said catalyst comprising a porous carrier and active components supported on the porous carrier, the active component comprising (a) at least one member selected from the group consisting of Rh, Pt and Pd; (b) at least one member selected from the group consisting of alkali metals and alkaline earth metals; and (c) Mn.

2. An internal combustion engine exhaust gas purification process according to claim 1, characterized in that the exhaust gas is contacted with a combustion catalyst capable of combusting HC and CO and then with the exhaust gas purification catalyst.

3. An internal combustion engine exhaust gas purification process according to claim 1, characterized in that the exhaust gas purified by the exhaust gas purification catalyst is further contacted with a combustion catalyst capable of combusting HC and CO.

4. An internal combustion engine exhaust gas purification process according to claim 1, wherein said catalyst further comprises at least one member selected from the group consisting of
   (d) at least one member selected from the group consisting of Ti and Si,
   (e) at least one member selected from the group consisting of Ni, Co and Cu,
   (f) at least one member selected from rare earth metals, and
   (g) at least one member selected from the group consisting of P and B.

5. A process for purifying internal combustion engine exhaust gas, which comprises
   contacting exhaust gas emitted from a lean-burn operated internal combustion engine with an exhaust gas purification catalyst comprising a porous carrier and active components supported on the same carrier, said active components comprising: (a) at least one member selected from the group consisting of Rh, Pt and Pd; (b) at least one member selected from the group consisting of alkali metals and alkaline earth metals; and (c) Mn, and
   purifying the exhaust gas,
      wherein operation of the internal combustion engine is temporarily shifted from the lean-burn operation to a stoichiometric air/fuel ratio operation or a fuel excess operation, thereby bringing an air/fuel ratio of the exhaust gas into a stoichimetric or fuel-rich state to regenerate the exhaust gas purification catalyst.

6. A process according to claim 5, wherein the exhaust gas purification catalyst further comprises one member selected from the group consisting of:
   (d) at least one member selected from the group consisting of Ti and Si,
   (e) at least one member selected from the group consisting of Ni, Co and Cu,
   (f) at least one member selected from rare earth metals, and
   (g) at least one member selected from the group consisting of P and B.

* * * * *